US009152389B2

(12) United States Patent
Takeda et al.

(10) Patent No.: US 9,152,389 B2
(45) Date of Patent: Oct. 6, 2015

(54) TRACE GENERATING UNIT, SYSTEM, AND PROGRAM OF THE SAME

(75) Inventors: Susumu Takeda, Kanagawa-ken (JP); Hidenori Matsuzaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 889 days.

(21) Appl. No.: 13/042,553

(22) Filed: Mar. 8, 2011

(65) Prior Publication Data

US 2012/0054722 A1      Mar. 1, 2012

(30) Foreign Application Priority Data

Aug. 30, 2010   (JP) ................................ P2010-192735

(51) Int. Cl.
```
G06F 9/45       (2006.01)
G06F 9/44       (2006.01)
G06F 11/34      (2006.01)
G06F 11/36      (2006.01)
```
(52) U.S. Cl.
CPC ............ *G06F 8/314* (2013.01); *G06F 11/3404* (2013.01); *G06F 11/3419* (2013.01); *G06F 11/3461* (2013.01); *G06F 11/3624* (2013.01); *G06F 11/3636* (2013.01)

(58) Field of Classification Search
None
See application file for complete search history.

(56) References Cited

U.S. PATENT DOCUMENTS

| 5,179,672 | A * | 1/1993 | Genduso et al. ............. 713/600 |
| 5,903,730 | A * | 5/1999 | Asai et al. ................... 709/224 |
| 2003/0114949 | A1 * | 6/2003 | Armstrong et al. ........... 700/107 |
| 2004/0194074 | A1 * | 9/2004 | Shibayama et al. .......... 717/151 |
| 2005/0188364 | A1 | 8/2005 | Cockx et al. |
| 2006/0031814 | A1 * | 2/2006 | Morin ........................... 717/104 |
| 2009/0019451 | A1 * | 1/2009 | Matsuzaki et al. ............ 718/107 |
| 2010/0138703 | A1 * | 6/2010 | Bansal et al. ................... 714/57 |

FOREIGN PATENT DOCUMENTS

JP      2006-277279      10/2006

OTHER PUBLICATIONS

Pillet, Vincent, et al. "Paraver: A tool to visualize and analyze parallel code." Proceedings of WoTUG-18: Transputer and occam Developments. vol. 44. Mar. 1995.*
Chen, Michael, and Kunle Olukotun. "Test: a tracer for extracting speculative threads." Code Generation and Optimization, 2003. CGO 2003. International Symposium on. IEEE, 2003.*
Notification of Reasons for Refusal issued by the Japanese Patent Office on Aug. 3, 2012, for Japanese Patent Application No. 2010-192735, and English-language translation thereof.
Horii et al., "MPIETE: An Execution Time Estimator for MPI Programs," Information Processing Society of Japan (Mar. 1, 2004), 2004:55-60, and English-language Abstract.

* cited by examiner

*Primary Examiner* — Chameli Das
*Assistant Examiner* — Joanne Macasiano
(74) *Attorney, Agent, or Firm* — Finnegan, Henderson, Farabow, Garrett & Dunner, L.L.P.

(57) ABSTRACT

A trace generating unit according to an embodiment of the present invention generates parallel trace information by executing a sequential program code, in case that the above-described sequential program code is parallelized and executed. The sequential program code includes a plurality of processing codes, codes to record a start and an end of the execution for each processing code, and codes to record a start and an end of the execution for each thread. The parallel trace information includes an execution sequence of the threads and an execution sequence of the processing codes for each thread.

6 Claims, 12 Drawing Sheets

Sequential code

```
void Main(){ for( int n=0; n < 100; n++){
    int M[64], sum;
    init(M);

add:{
      sum = 0;
      for( int i = 0; i < 64; i++ ){
        sum += M[i];
      }
      if ( sum > 128 ){
        process( sum );
      }
    }//end add mul:{
      sum = sum * 3;
    }//end mul sub:{
      sum = 0;
      for( int i = 0; i < 64; i++){
        sum -= M[i];
      }
    }//end sub }//end for

}
```

User derectives

```
Functional_split loop(n){
    Define thread_1: add, mul
    Define thread_2: sub
}
Define sync(1): thread1 -> thread_2
```

FIG. 2

```
Sequential code for tracing void Main(){
  thread_spawn("thread_1");        ← inserted
  thread_spawn("thread_2");        ← inserted for( int n=0; n < 100; n++){
    int M[64], sum;
    init(M);

section_enter("add", "thread_1");    ← inserted
    add:{
      sum = 0;
      for(int i = 0; i < 64; i++){
        sum += M[i];
      }
      if ( sum > 128 ){
        process(sum);
      }
    }//end add
    section_leave("add", "thread_1");    ← inserted
    sync_put("n");                       ← inserted section_enter("mul", "thread_1");    ← inserted
    mul:{
      sum = sum * 3;
    }//end mul
    section_leave("mul", "thread_1");    ← inserted sync_get("n");                       ← inserted
    section_enter("sub", ""thread_2");   ← inserted
    sub:{
      sum = 0;
      for( int i = 0; i < 64; i++){
        sum -= M[i];
      }
    }//end sub
    section_laeve("sub", "thread_2");    ← inserted }//end for thread_join("thread_1");        ← inserted
  thread_join("thread_2");        ← inserted
}
```

FIG. 3

Sequential code

```
void Main(){ for( int n=0; n < 100; n++){
    int M[64], sum;
    init(M);

add:{
      sum = 0;
      for( int i = 0; i < 64; i++ ){
        sum += M[i];
      }
      if ( sum > 128 ){
        process( sum );
      }
    }//end add mul:{
      sum = sum * 3;
    }//end mul sub:{
      sum = 0;
      for( int i = 0; i < 64; i++ ){
        sum -= M[1];
      }
    }//end sub }//end for

}
```

User derectives

```
Data_split loop(n){
  Define thread_1 : 0 <= n < 50
  Define thread_2 : 50 <= n < 100
}
```

```
Sequential code for tracing
void Main(){
  thread_spawn("thread_1");           ← inserted
  thread_spawn("thread_2");           ← inserted
  for( int n=0; n < 100; n++){
    int M[64], sum;
    init(M);
    if( 0<= n < 50){                  ← inserted
      section_enter("add", "thread_1");   ← inserted
    }else if(50 <= n < 100){          ← inserted
      section_enter("add", "thread_2");   ← inserted
    }                                 ← inserted
    add:{
      sum = 0;
      for( int i = 0; 1< 64; i++){
        sum += M[i];
      }
      if (sum > 128){
        process(sum);
      }
    }//end add
    if( 0<= n < 50){                  ← inserted
      section_leave("add", "thread_1");   ← inserted
      section_enter("mul", "thread_1");   ← inserted
    } else if(50 <= n < 100){         ← inserted
      section_leave("add", "thread_2");   ← inserted
      section_enter("mul", "thread_2");   ← inserted
    }                                 ← inserted
    mul:{
      sum = sum * 3;
    }//end mul
    if( 0 <= n < 50){                 ← inserted
      section_leave("mul", "thread_1");   ← inserted
      section_enter("sub", "thread_1");   ← inserted
    } else if(50 <= n < 100){         ← inserted
      section_leave("mul", "thread_2");   ← inserted
      section_enter("sub", "thread_2");   ← inserted
    }                                 ← inserted
    sub:{
      sum = 0;
      for( int i = 0; i < 64; i++){
        sum -= M[i];
      }
    }//end sub
    if( 0 <= n < 50){                 ← inserted
      section_leave("sub", "thread_1");   ← inserted
    } else if(50 <= n < 100){         ← inserted
      section_leave("sub", "thread_2");   ← inserted
    }                                 ← inserted
  }//end for
  thread_join("thread_1");            ← inserted
  thread_join("thread_2");            ← inserted
}
```

Sequential code

```
void Main(){
  int M[64], sum;
  int* p_M[64];

init(M);
  init(p_M);
  sum = 0;

for( int n=0; n < 100; n++ ){ set:{
      for( int i = 0; i < 64; i++ ){
        p_M[i] = &M[i];
      }
    }//end set cal:{
      for(int i = 0; i < 64; i++ ){
        sum += *p_M[i];
      }
      if ( sum > 128 ){
        process(sum);
      }
    }//end cal }//end for

}
```

User derectives

```
functional_split loop(n){
  Define thread_1: set
  Define thread_2: cal
}
```

FIG. 10

```
parallel code int M[64];
int* p_M[64];
sum;

Void thread_1(){
   for( int n=0; n < 100; n++ ){
      section_enter("set", "thread_1");
      set:{
         for( int i = 0; i < 64; i++ ){
            p_M[i] = &M[i];
         }
      }//end set
      section_leave("set", "thread_1");
   }//end for
}

Void thread_2(){
   for( int n=0; n < 100; n++ ){
      section_enter("cal", ""thread_2");
      cal:{
         for( int i = 0; i < 64; i++ ){
            sum += *p_M[i];
         }
         if( sum > 128){
            process(sum);
         }
      }//end cal
      section_leave("cal", "thread_2");
   }//end for
} void Main(){
   init(M);
   init(p_M);
   sum = 0;

thread_spawn("thread_1");
   thread_spawn("thread_2");

thread_join("thread_1");
   thread_join("thread_2");
}
```

FIG. 11

TRACE GENERATING UNIT, SYSTEM, AND PROGRAM OF THE SAME

CROSS-REFERENCE TO RELATED APPLICATIONS

This application is based upon and claims the benefit of priority from Japanese Patent Application No. P2010-192735, filed on Aug. 30, 2010; the entire contents of which are incorporated herein by reference.

TECHNICAL FIELD

Embodiments of the present invention relate to trace generation.

BACKGROUND

For developing a program code (hereinafter, parallel program code) in which at least a portion of the program code is partitioned into a plurality of processing units which can be executed in parallel, a lot of cost is required. At job sites of development, a parallel program code is created in many cases by parallelizing a program code (hereinafter, sequential program code) so as to be executed in parallel.

Performance evaluation of such a parallel program code can be performed by that a programmer actually creates and executes a parallel program code using a parallelization library such as p_thread and so on. But a lot of cost is required for creating a parallel program code. In addition, as a result of performance evaluation of a parallel program code, when policy of parallelization is to be changed, a parallel program code is to be created again.

There is a technology to automatically create a parallel program code from a sequential program code and parallelization information. But a parallel program code which is automatically created may be abnormally terminated by segmentation fault and so on if combination of input sequential program and parallelization information is no appropriate. In addition, even when the parallel program code is not abnormally terminated, there is a case that a bug such as data race affects a result of control statement which controls an execution path of a program, and a performance evaluation can not be properly performed.

BRIEF DESCRIPTION OF THE DRAWINGS

FIG. 2 is a diagram showing an example of an original program code and parallelization information.

FIG. 3 is a diagram showing an example of an evaluation program code.

FIG. 4 is a diagram showing an example of an original program code and parallelization information FIG. 5 is a diagram showing an example of an evaluation program code FIG. 10 is a diagram showing an example of an original program code and parallelization information FIG. 11 is a diagram showing an example of an evaluation program code according to a comparative example

DETAILED DESCRIPTION

Hereinafter, embodiments of the present invention will be described.

First Embodiment

Figure 1:
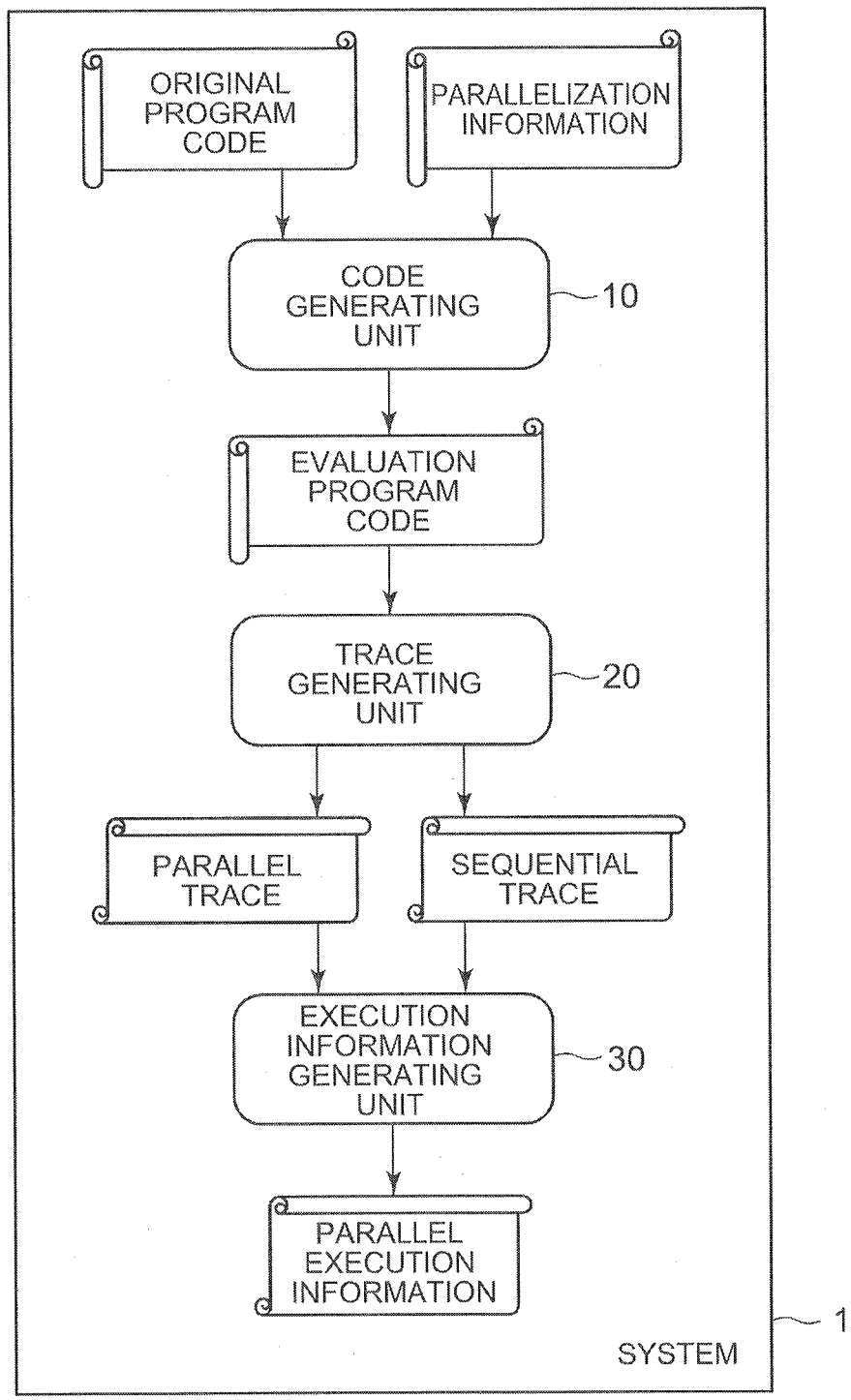
FIG. 1 is a diagram showing a configuration example of a system.

FIG. 1 is a diagram showing a system 1 according to a first embodiment.

This system 1 evaluates (predicts) performance in case that a sequential program code is parallelized and executed. This system 1 does not require creating a parallel program code from the sequential program code to evaluating the performance of the sequential program code.

This system 1 includes a code generating unit 10, a trace generating unit 20 and an execution information generating unit 30.

The code generating unit 10 generates, using parallelization information, a second sequential program code (hereinafter, evaluation program code) so as to evaluate the performance in case that a first sequential program code (hereinafter, original program code) is parallelized and executed.

The original program code and the parallelization information so as to parallelize the original program code are inputted to the code generating unit 10. The evaluation program code is generated according to the specification of the trace generating unit 20 which generates parallel trace information, the runtime environment (simulator) on which the evaluation program code is executed (simulated), and so on.

The trace generating unit 20 generates both parallel trace and sequential trace by executing the evaluation program code on a real machine or in a virtual execution environment. The parallel trace and the sequential trace indicate sequences etc. in which the evaluation program code is executed.

The execution information generating unit 30 generates parallel execution information using the parallel trace and the sequential trace. The parallel execution information indicates information relating to execution state in case that the original program code is parallelized and executed. The execution information generating unit 30 may use the parallel trace which the trance generating unit 20 has generated without change, or may use a parallel trace which is created or modified by a programmer (user).

The parallel trace and the parallel execution information can be used for evaluating the performance in case that the original program code is parallelized and executed.

The example of the system 1 shown in FIG. 1 includes the code generating unit 10, the trace generating unit 20 and the execution information generating unit 30. But the system 1 according to the first embodiment may include only one portion of these. Assuming that a programmer creates an evaluation program code, the system 1 may include the trace generating unit 20 and the execution information generating unit 30. If only the parallel trace is sufficient to evaluate a performance in case that the original program code is parallelized and executed, the system 1 may include the code generating unit 10 and the trace generating unit 20, or may include only the trace generating unit 20.

Each of the code generating unit 10, the trace generating unit 20 and the execution information generating unit 30 may be separated as an independent unit (or tool). Two or three of those code generating unit 10, trace generating unit 20 and execution information generating unit 30 may be merged as a single unit (or tool). Each of the code generating unit 10, the trace generating unit 20 and the execution information generating unit 30 may be composed of a plurality of sub units (or tools).

Hereinafter, the construction and operation and so on of each unit will be described in detail.

The original program code may be any type of program code which is executed sequentially. The original program code may be a program source code such as C language, Java (registered trade mark, hereinafter, the same) language, or may be a binary code, or any other type of program code which is executed sequentially.

The parallel program code is a program code in which at least a portion of the program code is partitioned into a plurality of processing units which can be executed in parallel. When the parallel program code is executed by a processor having a plurality of cores, plurality of processing units which are defined in the parallel program code as threads are allotted to computational resources such as the cores. The thread may be any unit, if it is a unit of processing which is allotted to the computational resource such as the core. In the case of parallelizing the original program code, the processings which are defined by the original program code are divided to the threads based on a method such as like functional parallelization and data parallelization.

The parallelization information may be any information which indicates how the original program code should be parallelized. The parallelization information includes at least segment information, a segment ID (Identification), thread information, and a thread ID. The segment information is information which determines a segment border inside the original program code to split original program into certain processing units, hereinafter we call this processing unit as processing code. The segment information may determine a segment of a processing code by a curly bracket with label of C language on the sequential program code, for example. Or, the segment information may determine a segment of a processing code by a file which is separated from the sequential program code using a information of line number of the sequential program code. The segment ID is information to uniquely identify each processing code. The thread information is information so as to determine how each of processing code is allotted to several threads (unit of parallel processing). The thread information may use segment ID to determine the map between thread and processing code, for example. Or, the thread information may use a line number of the original program code to determine each thread contains which processing code. The thread ID is information so as to uniquely identify a thread. Additionally, the parallelization information may include synchronization information to designate a synchronization relation between threads. The synchronization information may consists of not only sets of threads which are to be synchronized but also information about loop index variable, variable which is transferred between threads and code position for inserting synchronization (data transfer and exclusion control) as an additional information.

A programmer may create the parallelization information or it may be automatically generated by a tool, or a programmer may create a portion of the parallelization information and the rest of it may be generated by a tool. When the parallelization information is created by a programmer, may be written in an existing programming language by being added to the original program code, or it may be selected from GUI, or it may be created by combining these methods. In case that the parallelization information is automatically generated by a tool, the generated parallelization information may be inserted to the original program code or another file may be created according to the analysis of the original program code. The parallelization information may be a unity such as a file binary, or may be composed of a plurality of files and binaries. In an openMP, for example, as the parallelization information is written in the original program code, the original program code and the parallelization information are united.

The code generating unit 10 generates the evaluation program code from the original program code using the parallelization information. The code generating unit 10 may also be able to generate the parallel program code from the original program code (sequential program code).

The code generating unit 10 performs syntax analysis and binary analysis for the original program code. The code generating unit 10 may mend the original program code into internal representation such as AST (Abstract Syntax Tree). The code generating unit 10 generates the evaluation program code by inserting a code so as to generate the parallel trace into the original program code according to the parallelization information, hereinafter we call this inserted code as recording code. One of the example of this recording code is API (Application Program Interface) call for obtaining trace information). The code generating unit 10 may insert the recording code after converting the original program code into the internal representation such as the AST. The code generating unit 10 may insert the recording code into the original program code, while performing syntax analysis, without converting the original program code into internal representation.

The code generating unit 10 inserts the recording code into the original program code as described below. The code generating unit 10 inserts, for each thread, a thread start recording code (or thread start recording API call) so as to record execution start of the thread before any processing code which is allotted to the thread. The code generating unit 10 inserts, for each thread, a thread end recording code (or thread end recording API) so as to record execution end of the thread after the all processing codes which is allotted to the thread.

The thread start recording code and the thread end recording code have a means to designate the thread ID in the form of an argument, an API name or the like. The thread start recording code and the thread end recording code may be executed for each loop iteration, or may be executed once for a loop, or may be executed with various methods except this. With respect to these recording codes, designating description may be added on the evaluation program code or designating description may be added to the parallelization information by a programmer or a tool. Or, these recording codes may be designated with GUI and so on by a programmer.

The code generating unit 10 inserts a processing start recording code (or processing start recording API) so as to record execution start of each processing code before each processing code. The code generating unit 10 inserts a processing end recording code (or processing end recording API) so as to record execution end of each processing code after each processing code. The processing start recording code and the processing end recording code have a means to designate the segment ID and the thread ID to which the processing code belongs in the form of an argument, an API name or the like.

The code generating unit 10 may insert a synchronization wait recording code or a synchronization wait release recording code so as to designate synchronization relation of the processings between threads. When the synchronization wait recording code and the synchronization wait release recording code are executed by a computer, it is recorded that the synchronization wait recording code or the synchronization wait release recording code was executed. The synchronization wait recording code and the synchronization wait release recording code have a means to designate at least the thread ID to which the synchronization code belongs in the form of an argument, an API name or the like.

FIG. 2 is a diagram showing an example of an original program code (Sequential code) and parallelization information (User directives).

The original program code (Sequential code) includes a "for loop" and 3 processing codes labeled as add, mul, sub. Curly bracket { } is segment information for those processing codes which indicates the start and end position of each segment. Label Add, mul, sub are used as segment ID. Code within the curly bracket is the processing code itself.

The parallelization information (User directives) consists of thread information (Functional_split loop(n)) and synchronization information (Define sync(1)). The description "Functional_split loop(n)" designates that functional split is performed, a target loop to be parallelized is a loop composed of an index n, and one thread is generated for that loop. The inside of the curly bracket of the thread information (Functional_splitloop(n)) defines two threads by "Define thread_1" and "Define thread_2". The thread information (Functional_splitloop(n)) determines that the processing codes of add, and mul are allotted to a thread1 and the processing code of sub is allotted to a thread2. "thread1" and "thread2" are thread ID of each thread.

The description of the synchronization information "Define sync(1):thread_1->thread_2" defines the synchronization from "thread_1" to "thread_2". An argument "1" of "sync( )" determines that an iteration distance of the for loops of "thread_1" and "thread_2" is made "1". The iteration distance "1" indicates that the execution of n-th iteration of "thread_2" must be after the execution of n-th iteration of "thread_1".

FIG. 3 shows an evaluation program code corresponding to the original program code shown in FIG. 2. In FIG. 3, it is shown that codes (recording codes) which are indicated by arrows "Inserted" are added by the code generating unit.

The code generating unit inserts a thread start recording code (thread_spawn("thread_1")) of "thread_1" before the processing codes "add" and "mul" which are allotted to "thread_1". The code generating unit inserts a thread end recording code (thread_join("thread_1")) of "thread_1" after the processing codes "add" and "mul" which are allotted to "thread_1". As it is determined in the parallelization information that one thread is generated for one loop, the code generating unit inserts the thread start recording code and the thread end recording code at the outside of the loop including the processing codes "add" and "mul".

When it is determined in the parallelization information to generate a thread for a loop iteration, the code generating unit inserts a thread start recording code before the loop including the processing codes of add, mul which are allotted to "thread_1", and inserts a thread end recording code after the loop including the processing codes of add, mul which are allotted to "thread_1".

The code generating unit inserts a thread start recording code (thread_spawn("thread_2")) of "thread_2" before the processing code of sub which is allotted to "thread_2". The code generating unit inserts a thread end recording code (thread_join("thread_2")) of "thread_2" after the processing code of sub which is allotted to "thread_2". As it is determined in the parallelization information that one thread is generated for one loop, the code generating unit inserts the thread start recording code and the thread end recording code at the outside of the loop including the processing code of sub.

If it is designated in the parallelization information to generate a thread for a loop iteration, the code generating unit inserts a thread start recording code before the loop including the processing code of sub which is allotted to "thread_2" thread, and inserts a thread end recording code after the loop including the processing code of sub which is allotted to "thread_2".

The code generating unit inserts a processing start recording code of add (section_enter("add", "thread_1")) before the processing code of add and after the thread start recording code (thread_spawn("thread_1")) of the thread to which add belongs. The code generating unit inserts a processing end recording code of add (section_leave("add", "thread_1")) after the processing code of add and before a processing start recording code of the later processing code (mul) which belongs to the same thread (thread_1).

The code generating unit inserts the processing start recording code of mul (section_enter("mul", "thread_1")) before the processing code of mul and after the processing end recording code of the former processing code (add) which belongs to the same thread (thread_1). The code generating unit inserts a processing end recording code of mul (section_leave("mul", "thread_1")) after the processing code of mul and before the next processing code (sub) which does not belong to the same thread.

The code generating unit inserts a processing start recording code (section_enter("sub", "thread_2")) of sub before the processing code of sub and after the former processing code (mul) which does not belong to the same thread. The code generating unit inserts a processing end recording code (section_leave("sub", "thread_2")) of sub after the processing code of sub and before the thread end recording code (thread_join("thread_2")) of the thread to which sub belongs.

The code generating unit inserts a synchronization wait release recording code (sync_put("n")) after the processing end recording code of the processing code of add and before the processing start recording code of the processing code of mul. The code generating unit inserts a synchronization wait recording code (sync_get("n")) after the processing end recording code of the processing code of mul and before the processing start recording code of the processing code of sub. A programmer may designate the inserting positions of the synchronization wait recording code and the synchronization wait release recording code or they may be determined by a tool.

FIG. 4 shows an example of an original program code (Sequential code) and parallelization information (User directives).

The original program code (Sequential code) consists of a for loop and processing codes labeled as add, mul and sub. Curly bracket indicating start and end of those processing codes labeled as add, mul and sub are segment information. Here, Add, mul and sub are segment ID. Internal codes which exist inside the curly bracket indicating the start and end of add, mul, sub are a processing code.

The parallelization information (User directives) consists of thread information (Data_split loop(n)). The description of "Data_split loop(n)" designates that data split is performed, a loop to be parallelized is a loop composed of an index n, and a thread is generated for this loop. The inside of the curly bracket of the thread information (Data_splitloop(n)) defines two threads as "Define thread_1" and "Define thread_2". The thread information (Data_splitloop(n)) determines that the processing codes of label add, mul, sub of the iteration from 0-th to 49-th of the loop (the index n is not less than 0 and less than 50) are allotted to the thread 1 (thread1) and the processing codes of label add, mul, sub of the iteration from 50-th through 99-th of the loop (the index n is not less than 50 and less than 100) are allotted to the thread 2 (thread2). "thread1" and "thread2" are thread ID of each thread.

FIG. 5 is a diagram showing an evaluation program code corresponding to the original program code shown in FIG. 4. In FIG. 5, it is shown that the codes (recording codes) which are indicated by arrows "Inserted" are added by the code generating unit.

A method with which the code generating unit inserts the thread start recording code and the thread end recording code is the same as the method which is described in the example of FIG. 2, FIG. 3. Positions into which the code generating unit inserts the processing start recording code and the processing end recording code is the same as the method which is described in FIG. 2, FIG. 3. In the example of FIG. 4, FIG. 5, the code generating unit inserts the processing start recording code and the processing end recording code, and in addition, inserts further a control code (if statement, else if statement, and so on) so as to control the execution of those recording codes according to the number of iterations of the loop as described below.

The code generating unit inserts an if statement (if (0<=n<50)) so that the processing start recording codes (section_enter("add", "thread_1"), section_enter("mul", "thread_1"), section_enter("sub", "thread_1")) regarding to "thread_1" are executed in the case of the 0-th through the 49-th iterations of the loop (the index n is not less than 0 and less than 50).

The code generating unit inserts an else if statement (else if(50<=n<100)) so that the processing start recording codes (section_enter("add", "thread_2"), section_enter("mul", "thread_2"), section_enter("sub", "thread_2")) regarding to "thread_2" are executed in the case of 50-th to 99-th iterations of the loop (the index n is not less than 50 and less than 100).

The code generating unit inserts an if statement (if (0<=n<50)) so that the processing end recording codes (section_leave("add","thread_1"), section_leave("mul", "thread_1"), section_leave("sub", "thread_1")) regarding to "thread_1" are executed in the case of the 0-th through the 49-th iterations of the loop (the index n is not less than 0 and less than 50).

The code generating unit inserts an else if statement (else if(50<=n<100)) so that the processing end recording codes (section_leave("add", "thread_2"), section_leave("mul", "thread_2"), section_leave("sub", "thread_2")) regarding to "thread_2" are executed in the case of the 50-th through the 99-th iterations of the loop (the index n is not less than 50 and less than 100).

In the example of FIG. 5, we described an example which controls the execution of the recording codes by if and else if statements according to its loop iteration. But this execution control may be implemented inside the processing start/end recording codes (API). In addition, if exclusion control using mutual lock mechanism to synchronize between threads is employed, a code (API) "lock( )" to record (profile) obtaining the lock and a code (API) "unlock( )" to record (profile) releasing the lock and so on can be inserted. As described above, various codes (API) corresponding to the system can be added in the case the system requires extension.

The trace generating unit 20 generates a parallel trace (sequence information) of each thread indicating series of an anteroposterior relationship of the start of execution (section_enter) and the end of execution (section_leave) of the processing code which is allotted to each thread from the start of execution (thread_spawn) to the end of execution (thread_join) of the thread, by executing the evaluation program code. The trace generating unit 20 may execute the evaluation program code on an actual machine, or may execute in virtual environment such as a simulator to generate the parallel trace. When the evaluation program code is executed in virtual environment such as a simulator, the trace generating unit 20 can record the parallel trace by implementing a scheme so as to detect execution of the thread start recording code, the thread end recording code, the processing start recording code, and the processing end recording code in the virtual environment. Furthermore, said parallel trace of each thread may indicate series of an anteroposterior relationship of the synchronization wait recording code of execution (sync_get) and the synchronization wait release recording code of execution(sync_put) which is allotted to each thread.

Figure 6:
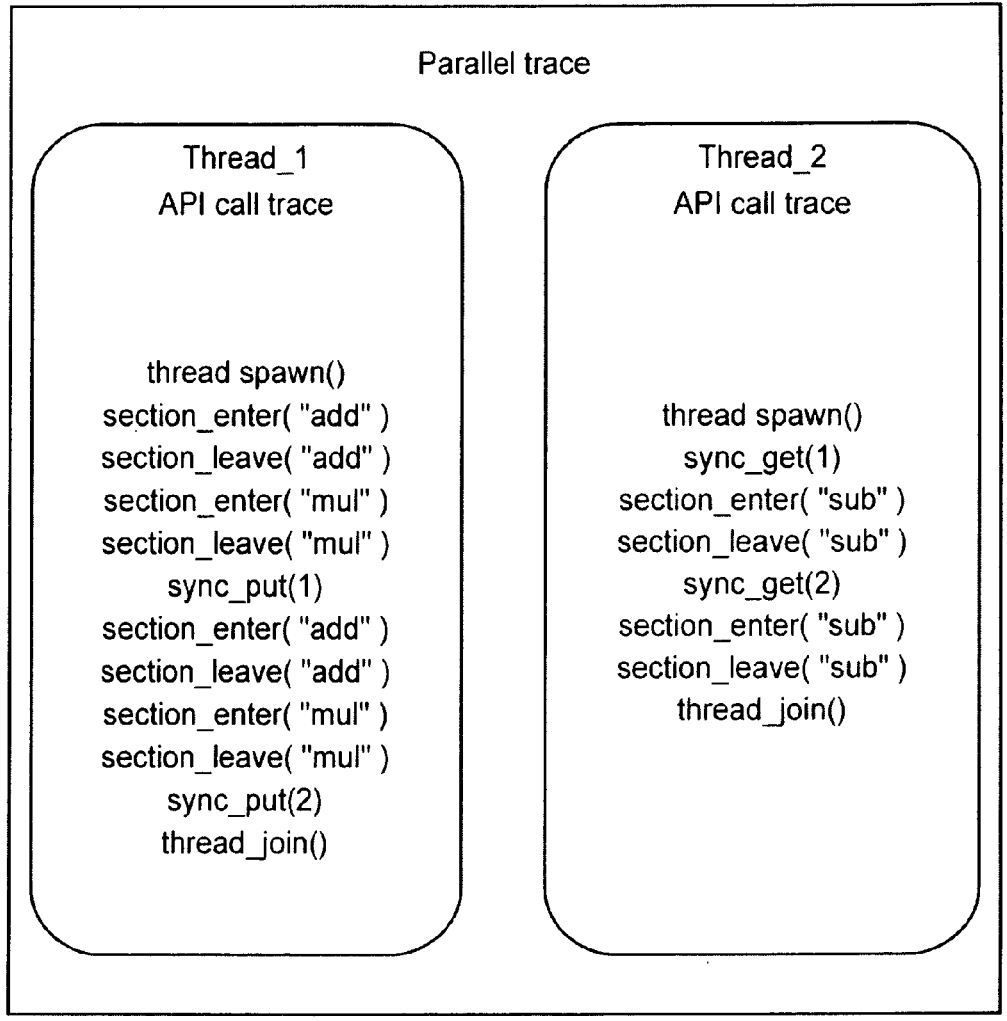
FIG. 6 is a diagram showing an example of a parallel trace

FIG. 6 is a diagram showing an example of a parallel trace.

When the trace generating unit 20 executes the thread start recording code (thread_spawn("thread_1")), it creates first sequence information (Thread_1 API call trace) so as to record an anteroposterior relationship of the start of execution and the end of execution of the processing code which is allotted to "thread_1".

Each time the trace generating unit 20 executes any of the processing start recording codes (section_enter("add", "thread_1"), (section_enter("mul","thread_1")) or the processing end recording codes (section_leave("add","thread_1"), section_leave("mul","thread_1")) which are allotted to the "thread_1", it records the start or end of the processing code in the first sequence information in time sequence order.

Each time the trace generating unit 20 executes any of the synchronization wait release recording codes (sync_put(1), sync_put(2)) of "thread_1", it may record the processing of the synchronization wait release recording code in the first sequence information in time sequence order. In this embodiment, the trace generating unit 20 chose the first sequence information to record since the synchronization wait release recording code is allotted to "thread1".

By executing like this, the trace generating unit 20 writes the execution anteroposterior relationship of the starts and ends of processing codes with label add, mul which are allotted to "thread_1" and the synchronization wait release recording codes in the first sequence information.

When the trace generating unit 20 executes the thread start recording code (thread_spawn("thread_2")), it creates second sequence information (Thread_2 API call trace) so as to record an anteroposterior relationship of the start of execution and the end of execution of the processing code which is allotted to "thread_2".

Each time the trace generating unit 20 executes any of the processing start recording code (section_enter("sub", "thread_2")) or the processing end recording code (section_leave("sub","thread_2")) which are allotted to the "thread_2", it records the start and end of the processing code in the second sequence information in the time sequence order.

Each time the trace generating unit 20 executes any of the synchronization wait recording codes (sync_get(1), sync_get (2)) with respect to "thread_2", it records the processing of the synchronization wait recording code in the second sequence information in time sequence order. In this embodiment, the trace generating unit 20 chose the second sequence information to record since the synchronization wait recording code is allotted to "thread1".

By executing like this, the trace generating unit 20 writes the anteroposterior relationship of the start and end and synchronization wait recording code with respect to the processing code of label sub which is allotted to the "thread_1" in the second sequence information.

When the trace generating unit 20 executes the thread start recording code (thread_spawn("thread_1")), it creates third sequence information so as to record an anteroposterior relationship of the start of execution and the end of execution of each thread.

Each time the trace generating unit 20 executes any of the thread start recording codes (thread_spawn("thread_1"), thread_spawn("thread_2")) and the thread end recording codes (thread_join("thread_1"), thread_join("thread_2")), it records the start and end of the thread in the third sequence information in time sequence order.

The trace generating unit 20 may generate the parallel trace in the form of a text file, a binary file or the like, or the recording code internally secures a logical queue and so on in the memory, and may generate the parallel trace by enqueueing an execution log of the recording code to the logical queue.

Figure 7:
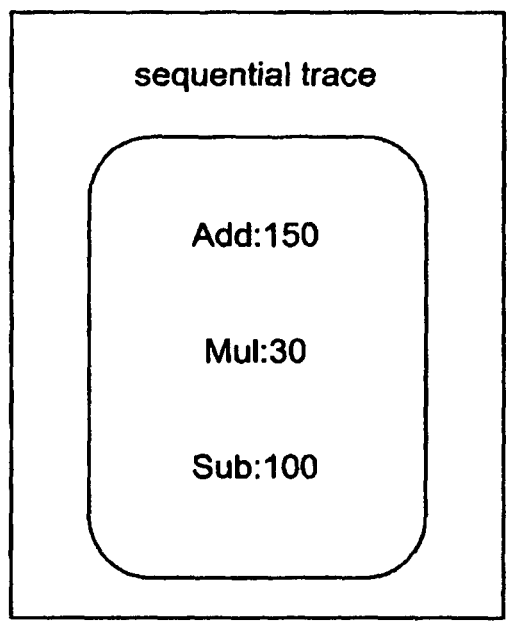
FIG. 7 is a diagram showing an example of a sequential trace

FIG. 7 is a diagram showing an example of a sequential trace. The trace generating unit 20 generates a sequential trace which contains execution information of each processing code by executing the evaluation program code. The sequential trace shown in FIG. 7 has average execution times 150, 30, 100 for the processing codes labeled add, mul, sub respectively.

The sequential trace is information representing the execution information of each of the processing codes. The sequential trace includes at least an execution time of each of the processing codes. The sequential trace may include, for each processing code, execution timings of the synchronization wait recording code and the synchronization wait release recording code, a waiting time for synchronization, a memory access trace, the number of cache accesses, the number of cache misses, the number of accessing a bus, the number of conflicts in using the bus, and information relating to the other hardware resource.

The trace generating unit 20 logs an execution time for each processing code, by executing the evaluation program code on an actual machine, and by determining a time when the processing start code is executed and a time when the processing end code is executed via an API of the OS. The execution time of the each processing code obtained in this manner is an execution time of one processing (in one iteration of the loop). The trace generating unit 20 can determine the average execution time (FIG. 7) for each processing code, by dividing the sum of execution times of each processing code which generated from executing evaluation program codes by the number of times of executions (the number of iterations of the loop). In addition, the execution time may be recorded using the other event like clock cycle or the number of processed instruction.

The execution time of the each processing code included in the sequential trace may be an average of the all execution time, may be recorded every time the processing code is executed or may be recorded by collecting the number of executions of the processing code for a certain level of granularity. The sequential trace may include more detailed information, such as execution information of processing code which is identified by function call stack The execution time of the each processing code which is included in the sequential trace may be measured by executing the evaluation program code on an actual machine, may be measured in virtual environment such as a simulator, or may be previously given by a programmer. Other information such as cache information which can be included in the sequential trace may be obtained by performance monitor function which is provided by an LSI.

The execution time of the each processing code which is included in the sequential trace may be measured by executing a program code which is created so as to obtain the sequential trace by inserting the processing start recording code and the processing end recording code in the original program code.

The execution information generating unit 30 generates the parallel execution information from the parallel trace and the sequential trace. The parallel execution information is execution information (predicted value) in case that the original program code is parallelized and executed. The parallel execution information includes at least an execution time of each thread and an execution time of each processing code in the each thread. The parallel execution information may further include a waiting time for synchronization in a thread. The parallel execution information may include, for each thread, execution timings of the synchronization wait recording code and the synchronization wait release recording code, the number of cache accesses, the number of cache misses, the number of accessing a bus, the number of conflicts in using the bus, the other hardware resource information, the data race detection result, the other bug information. The parallel information may be displayed visually with a wave form file and so on, and may be displayed in the form of a text file.

The execution information generating unit 30 generates the parallel execution information by calling a simulation API in accordance with the start and end of the thread, the start and end of the processing code, the processing of the synchronization wait recording code and the synchronization wait release recording code which are recorded in the parallel trace. The simulation API is an API which has function to perform simulation of the parallel execution and to output the result.

Figure 8:
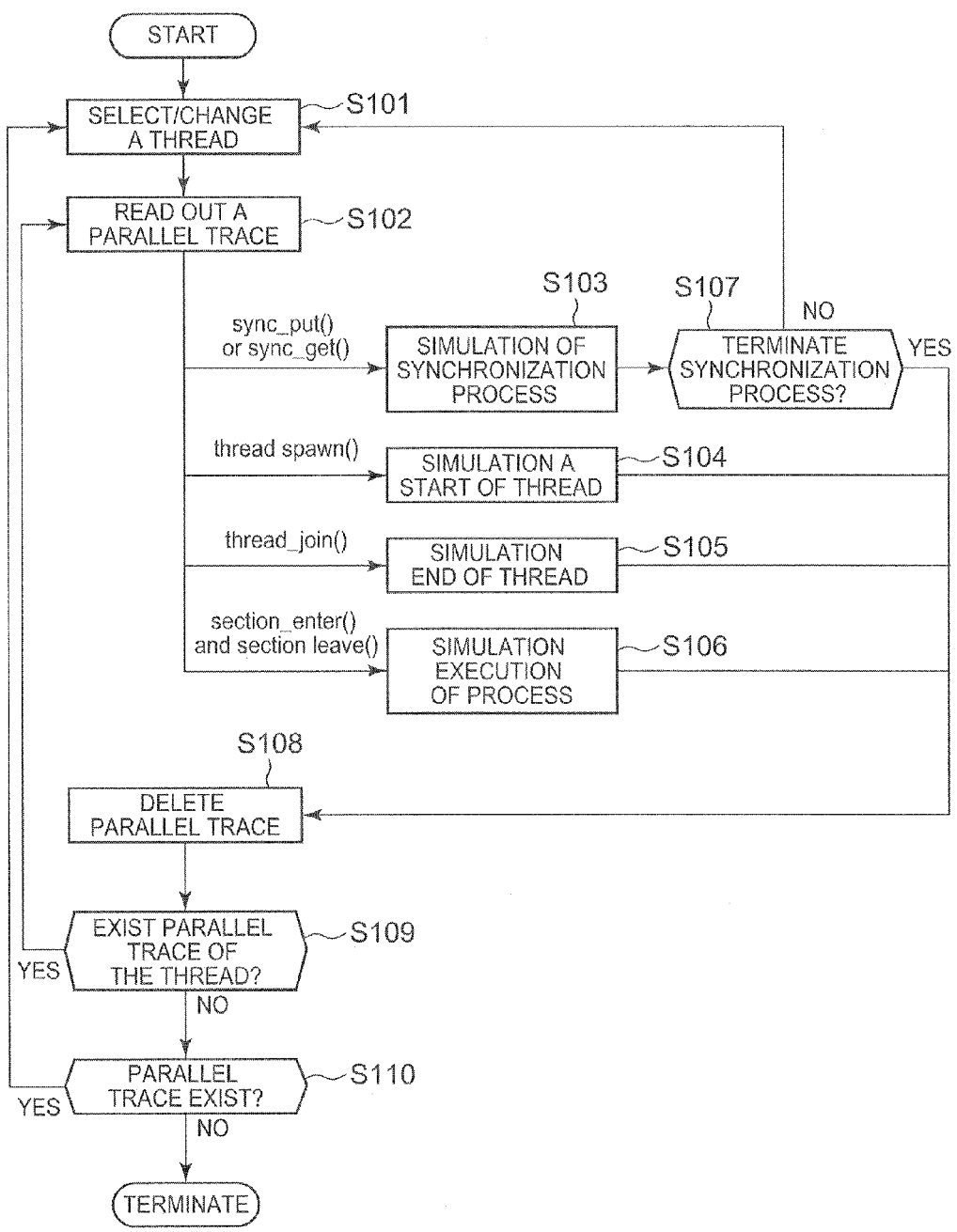
FIG. 8 is a flow chart showing a processing of simulation

FIG. 8 is a flow chart showing an operation of the execution information generating unit 30.

Figure 9:
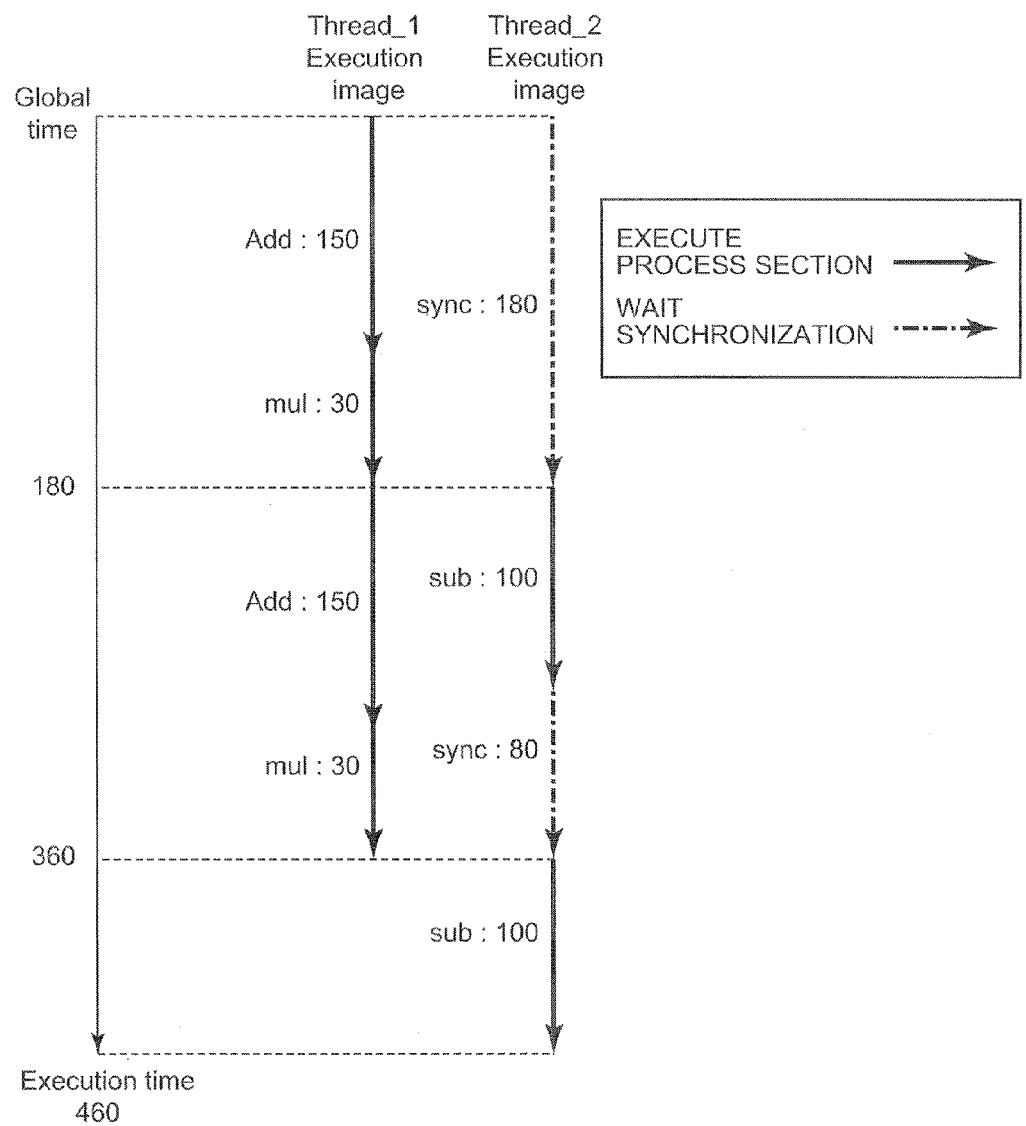
FIG. 9 is a diagram showing an example of parallel execution information

FIG. 9 is a diagram showing an example of parallel execution information.

Hereinafter, it will be described that the execution information generating unit 30 generates the parallel execution information shown in FIG. 9 using the parallel trace shown in FIG. 6 and the sequential trace shown in FIG. 7 according to the operation shown in FIG. 8.

To begin with, the execution information generating unit 30 reads out the recording code (thread_spawn( )) in "thread_1" from the parallel trace (first sequence information) (steps S101, S102). The execution information generating unit 30 sets a local time of "thread_1" to "0" (a step S104). The execution information generating unit 30 deletes "thread_spawn( )" from the first sequence information (a step S108, "yes" in a step S109).

Next, the execution information generating unit 30 reads out "section_enter("add")" and "section_leave("add")" from the first sequence information (the step S102). The execution information generating unit 30 reads out the execution time 150 of the processing code of add from the sequential trace. The execution information generating unit 30 sets forward the local time of "thread_1" by the execution time 150 of the processing code of add (the step S106). The execution information generating unit 30 deletes "section_enter("add")" and "section_leave("add")" from the first sequence information (the step S108, "yes" in the step S109).

Next, the execution information generating unit 30 reads out "section_enter("mul")" and "section_leave("mul")" from the first sequence information (the step S102). The execution information generating unit 30 reads out the execution time 30 of the processing code of mul from the sequential trace. The execution information generating unit 30 sets forward the local time of "thread_1" by the execution time 30 of the processing code of mul (the step S106). The execution information generating unit 30 deletes "section_enter("mul")" and "section_leave("mul")" from the first sequence information (the step S108, "yes" in the step S109).

Next, the execution information generating unit 30 reads out the synchronization wait release recording code "sync_put(1)" from the first sequence information (the step S102, a step S103, "no" in a step S107). This synchronization wait release recording code of "thread_1" corresponds to the synchronization wait code of "thread_2". The execution information generating unit 30 changes a reading out source from the first sequence information to the second sequence information of the parallel trace (the step S101). The execution information generating unit 30 deletes "sync_put(1)" from the first sequence information.

Next, the execution information generating unit 30 reads out "thread_spawn( )" from the parallel trace (second sequence information) (the step S102), and sets a local time of "thread_2" to "0" (the step S104). The execution information generating unit 30 deletes "thread_spawn( )" from the second sequence information (the step S108, "yes" in the step S109).

Next, the execution information generating unit 30 reads out "sync_get(1)" from the second sequence information (the step S102). The execution information generating unit 30 sets forward the local time of "thread_2" to the local time 180 of "thread_1" (the step S103, "yes" in the step S107). The execution information generating unit 30 deletes "sync_get(1)" from the second sequence information (the step S108, "yes" in the step S109).

Next, the execution information generating unit 30 reads out "section_enter("sub")" and "section_leave("sub")" from the second sequence information (the step S102). The execution information generating unit 30 reads out the execution time 100 of the processing code of sub from the sequential trace. The execution information generating unit 30 sets forward the local time of "thread_2" by the execution time 100 of the processing code of sub (the step S106). The execution information generating unit 30 deletes "section_enter("sub")" and "section_leave("sub")" from the second sequence information (the step S108, "yes" in the step S109).

Next, the execution information generating unit 30 reads out the synchronization wait recording code "sync_get(2)" from the second sequence information (the steps S102, S103, "no" in the step S107). This synchronization wait recording code "sync_get(2)" of "thread_2" corresponds to the synchronization wait release recording code "sync_put(2)" of "thread_1". The synchronization wait release recording code "sync_put(2)" of "thread_1" is not executed yet.
The execution information generating unit 30 changes the reading out source from the second sequence information to the first sequence information of the parallel trace (the step S101). Here, the execution information generating unit 30 does not delete "sync_get(2)" from the second sequence information.

Next, the execution information generating unit 30 reads out "section_enter("add")" and "section_leave("add")" from the first sequence information (the step S102), and similarly, sets forward the local time of "thread_1" by the execution time 150 of the processing code of add (the step S106). The execution information generating unit 30 deletes "section_enter("add")" and "section_leave("add")" from the first sequence information (the step S108, "yes" in the step S109).

Next, the execution information generating unit 30 reads out "section_enter("mul")" and "section_leave("mul")" from the first sequence information (the step S102), and similarly, sets forward the local time of "thread_1" by the execution time 30 of the processing code of mul (the step S106). The execution information generating unit 30 deletes "section_enter("mul")" and "section_leave("mul")" from the first sequence information (the step S108, "yes" in the step S109).

Next, the execution information generating unit 30 reads out the synchronization wait release recording code "sync_put(2)" from the first sequence information (the steps S102, S103, "no" in the step S107). This synchronization wait release recording code of "thread_1" corresponds to the synchronization wait code of "thread_2". The execution information generating unit 30 changes the reading out source from the first sequence information to the second sequence information of the parallel trace (the step S101). The execution information generating unit 30 deletes "sync_put(2)" from the first sequence information.

Next, the execution information generating unit 30 reads out "sync_get(2)" from the second sequence information (the step S102). The execution information generating unit 30 sets forward the local time of "thread_2" to the local time 360 of "thread_1" (the step S103, "yes" in the step S107). The execution information generating unit 30 deletes "sync_get (2)" from the second sequence information (the step S108, "yes" in the step S109).

Next, the execution information generating unit 30 reads out "section_enter("sub")" and "section_leave("sub")" from the second sequence information (the step S102), and similarly, sets forward the local time of "thread_2" by the execution time 100 of the processing code of sub (the step S106). The execution information generating unit 30 deletes "section_enter("sub")" and "section_leave("sub")" from the second sequence information (the step S108, "yes" in the step S109).

Next, the execution information generating unit 30 reads out "thread_join( )" from the second sequence information (the step S102, a step S105). The execution information generating unit 30 deletes "thread_join( )" from the second sequence information (the step S108). The execution information generating unit 30 finishes the simulation of "thread_2" ("no" in the step S109). The execution information generating unit 30 changes the reading out source from the second sequence information to the first sequence information of the parallel trace ("yes" in a step S110, the step S101).

Next, the execution information generating unit 30 reads out "thread_join( )" from the first sequence information (the steps S102, S105). The execution information generating unit 30 deletes "thread_join( )" from the first sequence information (the step S108). The execution information generating unit 30 finishes the simulation of "thread_1" ("no" in the step S109).

With the above-described processing, the execution information generating unit 30 finishes the simulation of "thread_1" and "thread_2" ("no" in the step S110), and generates the parallel execution information shown in FIG. 9. In addition, a simulation example in a simple model is shown in the above-described example, but it is possible to perform simulation in a more complicated model. In this example, trace of calling "thread_spawn( )" and "thread_join( )" are meaningless as information since waiting processing between threads at "thread_join( )" was not simulated. But in a more complicated program (particularly, when threads are issued following the above-described processing), waiting between the threads at "thread_join( )" (barrier synchronization and so on, for example) can be simulated. In order to perform the simulation like this, the trace information of "thread_spawn( )" and "thread_join( )" is required. Furthermore, the execution information generating unit 30 may simulate the parallel execution using the execution time of each loop iteration. In this case, both the sequential trace and the parallel trace have the loop index information.

According to the system 1 of the first embodiment, it is possible to obtain the parallel trace of parallel program code by executing a sequential program code, without creating a parallel program code. It is possible to obtain the parallel execution information in case that the original program code is parallelized and executed, without creating a parallel program code.

As it is not necessary to create a parallel program code so as to obtain the parallel trace and the parallel execution information, load and cost of the development of a parallel program code can be reduced greatly. As the performance in case that the sequential program code (original program code) is parallelized and executed can be predicted early, cut and try can be performed rapidly with respect to a sequential program code and the policy of parallelization (parallelization information), and a high performance parallel program code can be developed.

Hereinafter, the effect of the system 1 according to the first embodiment will be described using a comparative example.

FIG. 10 is a diagram showing an example of a sequential program code (sequential code) and parallelization information (User directives) capable of causing problems.

The sequential program code includes processing codes labeled set and cal, and segment IDs (set, cal). The description of functional_split loop(n) in the parallelization information designates that functional split is performed, a loop to be parallelized is a loop of an index n, and one thread is generated for one loop. Grouping curly brackets of Functional_split loop (n) defines two threads by "Define thread_1" and "Define thread_2". Thread IDs are "thread_1" and "thread_2". The parallelization information (Functional_split loop (n)) allots the processing code of set to "thread_1" and the processing code of cal to "thread_2", respectively.

FIG. 11 is a comparative example showing an evaluation program code which is generated from the sequential program code shown in FIG. 10 according to the parallelization information shown in FIG. 10. In FIG. 11, a value is substituted to a pointer p_M[i] in "thread_1". In "thread_2", calculation of a variable of the reference destination by the pointer p_M[i] is performed.

In the sequential program code of FIG. 10, it is assured that processing of the processing code of cal is executed after the processing code of set. However, in the parallel program code of FIG. 11, the synchronization between "thread_1" and "thread_2" is not defined, and the execution order of the processing code of set and the processing code of cal which belong to the same loop iteration is not assured.

Accordingly, it may occur that the processing code of cal is executed before the processing code of set is executed, here both of which belong to the same loop iteration. In this case, as null pointer access is caused, and the program terminates abnormally, performance evaluation can not be performed in case that the sequential program code of FIG. 10 is parallelized and executed.

Figure 12:
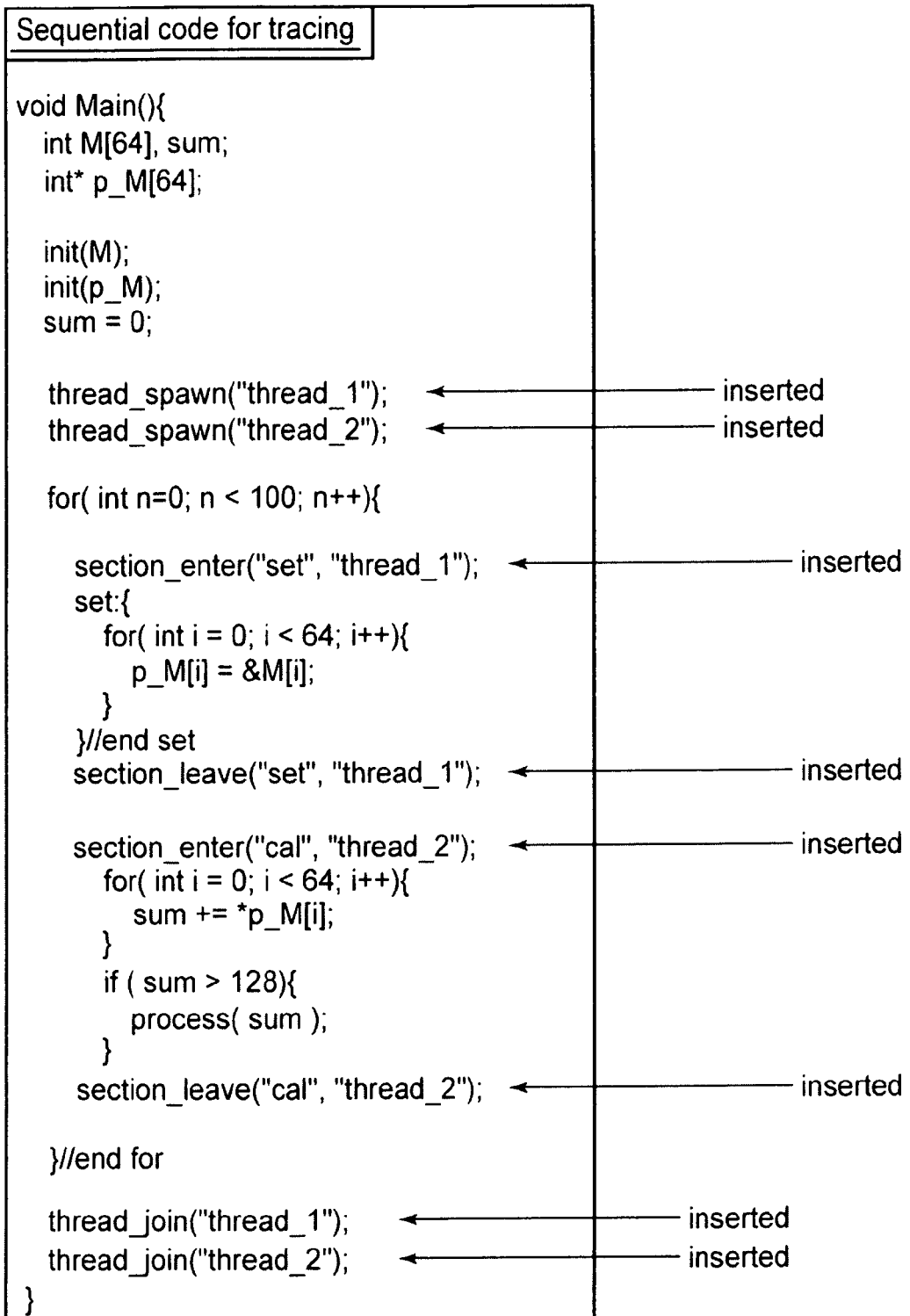
FIG. 12 is a diagram showing an example of an evaluation program code

FIG. 12 is a diagram showing an evaluation program code which is generated from the sequential program shown in FIG. 10 according to the parallelization information shown in FIG. 10 by the system 1 according to the first embodiment.

In the evaluation program code of FIG. 12, the execution sequence of the processing code of set and the processing code of cal in the same loop iteration is assured in the same manner as the sequential program code before conversion shown in FIG. 10. Accordingly, it can be executed without causing abnormal termination, and a parallel trace and so on can be obtained in the method as described above, without generating a parallel program code.

As described above, in any combination of an original program code (sequential program code) and parallelization information, the system 1 according to the first embodiment can generate an evaluation program code from these, and can obtain a parallel trace from the evaluation program code.

In any combination of an original program code and parallelization information, the system 1 according to the first embodiment can generate a parallel trace and parallel execution information in case that the original program code is parallelized and executed, without generating a parallel program code.

In addition, this system 1 can also be realized by using a general-purpose computer unit as basic hardware. That is, the code generating unit 10, the trace generating unit 20 and the execution information generating unit 30 can be realized by executing a program by a processor mounted in the above-described computer unit. In addition, this system 1 can be realized such that any one of 1) only the trace generating unit 20, 2) the code generating unit 10 and the trace generating unit 20, or 3) the trace generating unit 20 and the execution information generating unit 30 is realized by executing a program by a processor mounted in the above-described computer unit. In this time, the code generating unit 10, the trace generating unit 20 and the execution information generating unit 30 may be realized by previously installing the above-described program on the computer unit, or they may be realized by storing the program in a memory media such as a CD-ROM or by distributing the above-described program via a network, and by installing this program in the computer unit arbitrarily. In addition, memories which are built in the code generating unit 10, the trace generating unit 20 and the execution information generating unit 30 can be realized by arbitrarily utilizing a memory which is built in the above-described computer unit, an external memory, a hard disc or memory media such as CD-R, CD-RW, DVD-RAM, DVD-R.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claim is:

1. A trace generating unit to generate parallel trace information, by executing a sequential program code, the trace generating unit comprising:
   a processor; and
   a memory coupled to the processor, storing instructions which, when executed by the processor, cause the processor to parallelize and execute the sequential program code as one sequential program, said sequential program code comprising:
   a first processing code to define not less than one processing which is allotted to a first thread,
   a second processing code to define not less than one processing which is allotted to a second thread,
   first and second processing start recording codes which are inserted before the first and second processing codes so as to record execution start for the first and second processing codes, respectively, first and second processing end recording codes which are inserted after the first and second processing codes so as to record execution end for the first and second processing codes, respectively, a first thread start recording code which is inserted before the first processing code so as to record execution start of the first thread, a first thread end recording code which is inserted after the first processing code so as to record execution end of the first thread, a second thread start recording code which is inserted before the second processing code so as to record execution start of the second thread, and a second thread end recording code which is inserted after the second processing code so as to record execution end of the second thread; and said parallel trace information includes, first sequence information indicating an anteroposterior relationship of the execution start and the execution end of the first processing code which is allotted to the first thread in a time from the execution start to the execution end of the first thread, second sequence information indicating an anteroposterior relationship of the execution start and the execution end of the second processing code which is allotted to the second thread in a time from the execution start to the execution end of the second thread, and third sequence information indicating an anteroposterior relationship of the execution start and the execution end of the first thread, and the execution start and the execution end of the second thread in a time from execution start to execution end of the sequential program code;

wherein said sequential program code further comprises, a synchronization wait recording code which is inserted before the second processing code so as to wait for the execution start of the second processing code until the execution of the first processing code ends, and a synchronization wait release recording code which is inserted after the first processing code so as to release execution wait of the second processing code;

wherein said first sequence information indicates an execution anteroposterior relationship of the start and the end of the first processing code which is allotted to the first thread, and the synchronization wait release recording code; and said second sequence information indicates an execution anteroposterior relationship of the start and the end of the second processing code which is allotted to the second thread, and the synchronization wait recording code.

2. A system comprising the trace generating unit as recited in claim 1, and an execution information generating unit to generate parallel execution information, in case that the sequential program code is parallelized and executed, using the parallel trace information and processing times for the respective first and second processing codes, wherein:

said execution information generating unit, (a) determines timings of the execution starts of the first and second threads using the third sequence information, (b) determines an execution time of the first thread and a timing of the execution end of the first thread using the first sequence information and the execution time of the first processing code, (c) determines an execution time of the second thread and a timing of the execution end of the second thread using the second sequence information and the execution time of the second processing code, and (d) determines a timing of execution start of another thread using the timing of the execution end of one of the first and second processing codes; and said parallel execution information comprises, the timing of the execution start, the execution time, and the timing of the execution end of the first thread, and the timing of the execution start, the execution time, and the timing of the execution end of the second thread.

3. A system comprising the trace generating unit as recited in claim 1, and an execution information generating unit to generate parallel execution information, in case that the sequential program code is parallelized and executed, using the parallel trace information and processing times for the respective first and second processing codes, wherein:

said execution information generating unit, (a) determines timings of the execution starts of the first and second threads using the third sequence information, (b) determines an execution time of the first thread and a timing of the execution end of the first thread using the first sequence information, and the execution time of the first processing code, (c) determines an execution time of the second thread and a timing of the execution end of the second thread using the second sequence information and the execution time of the second processing code, and (d) determines, using the timing of the execution end of one of the first and second processing codes, a timing of execution start of another thread;

when the timing of processing the synchronization wait recording code is earlier than the timing of processing the synchronization wait release recording code, a wait time depending on a difference of the timings of processing the synchronization wait recording code and the synchronization wait release recording code is included in the execution time of the first thread; and said parallel execution information further includes, the timing of the execution start, the execution time, and the timing of the execution end of the first thread, and the timing of the execution start, the execution time, and the timing of the execution end of the second thread.

4. A system comprising a program generating unit to generate the sequential program code and the trace generating unit as recited in claim 1, wherein:

said program generating unit generates the sequential program code, for a program code including the first and second processing codes in which the second processing code is located after the first processing code, by (a) inserting the first thread start recording code before the first processing code, (b) inserting the first processing start recording code after the first thread start recording code and before the first processing code, (c) inserting the first processing end recording code after the first processing code and before the second processing code, (d) inserting the first thread end recording code after the first processing end recording code, (e) inserting the second thread start recording code before the second processing code, (f) inserting the second processing start recording code after the second thread start recording code and before the second processing code, (g) inserting the second processing end recording code after the second processing code, and
(h) inserting the second thread end recording code after the second processing end recording code.

5. The trace generating unit as recited in claim 1, wherein: said trace generating unit,
(a) determines an execution time of the first processing code from a difference between a timing of executing the first processing start recording code and a timing of executing the first processing end recording code, and
(b) determines an execution time of the second processing code from a difference between a timing of executing the second processing start recording code and a timing of executing the second processing end recording code.

6. A non-transitory computer readable medium storing a trace generating program that, when executed by a processor, causes the processor to perform operations comprising:
generating parallel trace information by parallelizing and executing a sequential program code as one sequential program, wherein said sequential program code comprises:
a first processing code to define not less than one processing which is allotted to a first thread,
a second processing code to define not less than one processing which is allotted to a second thread,
first and second processing start recording codes which are inserted before the first and second processing codes so as to record execution start for the first and second processing codes, respectively,
first and second processing end recording codes which are inserted after the first and second processing codes so as to record execution end for the first and second processing codes, respectively,
a first thread start recording code which is inserted before the first processing code so as to record execution start of the first thread,
a first thread end recording code which is inserted after the first processing code so as to record execution end of the first thread,
a second thread start recording code which is inserted before the second processing code so as to record execution start of the second thread, and
a second thread end recording code which is inserted after the second processing code so as to record execution end of the second thread; and
the parallel trace information comprises,
first sequence information indicating an anteroposterior relationship of the execution start and the execution end of the first processing code which is allotted to the first thread in a time from the execution start to the execution end of the first thread,
second sequence information indicating an anteroposterior relationship of the execution start and the execution end of the second processing code which is allotted to the second thread in a time from the execution start to the execution end of the second thread, and
third sequence information indicating an anteroposterior relationship of the execution start and the execution end of the first thread, and the execution start and the execution end of the second thread in a time from execution start to execution end of the sequential program code;
wherein said sequential program code further comprises,
a synchronization wait recoding code which is inserted before the second processing code so as to wait for the execution start of the second processing code until the execution of the first processing code ends, and
a synchronization wait release recording code which is inserted after the first processing code so as to release execution wait of the second processing code;
wherein said first sequence information indicates an execution anteroposterior relationship of the start and the end of the first processing code which is allotted to the first thread, and the synchronization wait release recording code; and
said second sequence information indicates an execution anteroposterior relationship of the execution start and the execution end of the second processing code which is allotted to the second thread, and the synchronization wait recording code.

* * * * *